United States Patent [19]

Scheurenbrand et al.

[11] Patent Number: 5,078,169

[45] Date of Patent: Jan. 7, 1992

[54] FUEL TANK

[75] Inventors: Dieter Scheurenbrand, Wolfschlugen; Peter Weymann, Stuttgart; Aldolf G. Triffterer, Nürtingen; Alfons Ziegelbauer, Stuttgart, all of Fed. Rep. of Germany

[73] Assignee: Daimler-Benz Aktiengesellschaft, Fed. Rep. of Germany

[21] Appl. No.: 520,448

[22] Filed: May 8, 1990

[30] Foreign Application Priority Data

May 10, 1989 [DE] Fed. Rep. of Germany ....... 3915185

[51] Int. Cl.$^5$ ............................................. F02M 33/02
[52] U.S. Cl. ...................................... 137/574; 137/571
[58] Field of Search .............. 137/573, 574, 576, 567, 137/590, 571, 263, 265; 417/174

[56] References Cited

U.S. PATENT DOCUMENTS

| | | | |
|---|---|---|---|
| 2,953,156 | 9/1960 | Bryant | 137/576 |
| 4,703,771 | 11/1987 | Mimura | 137/571 X |
| 4,838,307 | 6/1989 | Sasaki et al. | 137/571 X |

FOREIGN PATENT DOCUMENTS

| | | |
|---|---|---|
| 2440905 | 3/1976 | Fed. Rep. of Germany . |
| 3612194 | 10/1986 | Fed. Rep. of Germany . |
| 2180595 | 9/1986 | United Kingdom . |
| 2196914 | 9/1987 | United Kingdom . |

*Primary Examiner*—Martin P. Schwadron
*Assistant Examiner*—Kevin L. Lee
*Attorney, Agent, or Firm*—Evenson, Wands, Edwards, Lenahan and McKeown

[57] ABSTRACT

A fuel tank having two tank spaces spaced from one another and connected to one another at a distance above their bottom. One tank space is equipped at its bottom with a retaining vessel having a closed shell. To assure that both tank spaces are reliably emptied, each tank space is equipped with a jet pump charged with fuel via a supply line. Both of the jet pumps, which are parallel or series connected to each other, deliver fuel to the retaining vessel.

8 Claims, 1 Drawing Sheet

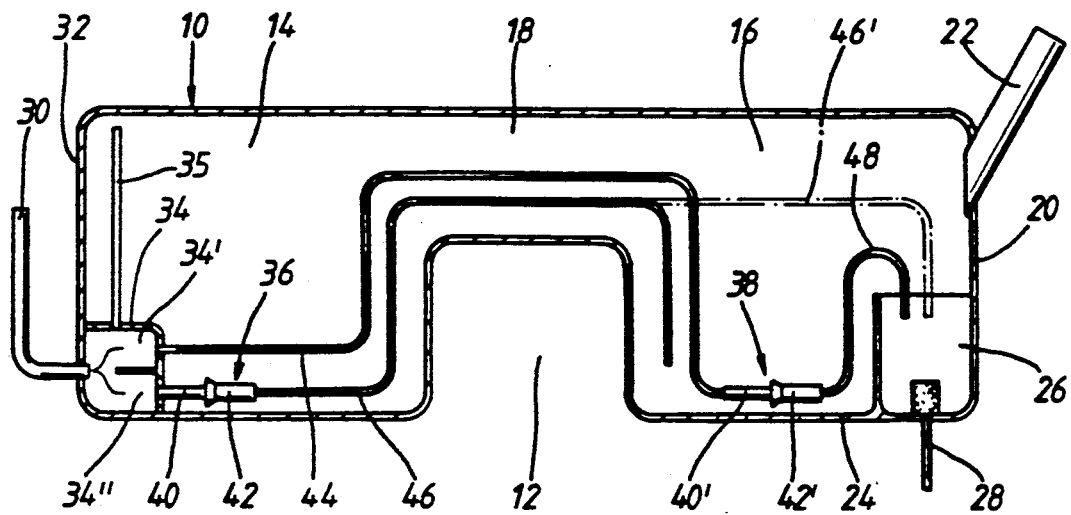

5,078,169

FUEL TANK

BACKGROUND AND SUMMARY OF THE INVENTION

The present invention relates to a fuel tank and, more particularly, to a fuel tank having two tank spaces in which reliable emptying of both spaces is assured.

A dual space fuel tank is shown in German Offenlegungsschrift No. 2,440,950. Each of the tank spaces is equipped at the bottom with a recess in which, when the tank has largely been emptied, the fuel still remaining in the tank spaces collects. Fuel for the operation of an internal combustion engine is here drawn off via a suction line from the bottom recess of one tank space. A fuel return line leads into the other tank space in order to again store fuel not consumed by the internal combustion engine. This fuel flowing back is, at the same time, used as a delivery medium for emptying this tank space.

Although this construction ensures reliable emptying of both tanks spaces, it requires bulges at the bottom which, on account of predetermined vehicle construction and design factors, often cannot be provided for installing the fuel tank.

Moreover, transfer pumping from one tank space into the other tank space will not ensure complete emptying of both tank spaces if it is not possible to arrange appropriate bottom recesses, but, instead, it is only possible to arrange a retaining vessel in one tank space for drawing off fuel. In this construction, although the jet pump installed in the other tank space would constantly pump fuel from this tank space into the retraining vessel, and the vessel would also be completely emptied, fuel would be removed from the tank space accommodating the retaining vessel only as long as the fuel level were above the rim of the retaining vessel. If the retaining vessel were completely empty, a relatively large unused fuel quantity would still remain in this tank space.

German Patent Specification No. 3,612,194 discloses a fuel tank in which, via a jet pump, fuel is pumped into the retaining vessel arranged on the tank bottom. Here, however, this fuel tank is merely a fuel tank which is not subdivided into various tank spaces. In this respect, this construction is similar to the one described in German Offenlegunqsschrift No. 2,440,905, in the use of a jet pump to pump fuel directly into the retaining vessel from the existing fuel supply.

It is therefore an object of the present invention to improve a fuel tank comprising two spaces in ,such a way that, even in the case of a retaining vessel rising from the bottom of one tank space, reliable emptying of both tank spaces is ensured.

This object has been achieved in accordance with the invention by providing a retaining vessel having a closed shell and extending upwards from a bottom of one tank space, and providing a jet pump in that one tank space for delivering fuel to the retaining vessel.

By installing a jet pump in the tank space containing the retaining vessel, fuel is reliably delivered from this tank space to the retaining vessel. This arrangement has the advantage of assuring that both tank spaces have first been completely emptied before complete emptying of the retaining vessel.

BRIEF DESCRIPTION OF THE DRAWINGS

These and other features, objects and advantages of the present invention will become more apparent from the following detailed description of presently preferred embodiments when taken in conjunction with the accompanying drawings wherein:

FIG. 1 is a longitudinal sectional elevation view through one embodiment of a fuel tank in accordance with the present invention; and FIG. 2 is a cross-sectional view below the upper wall of a second embodiment of a fuel tank in accordance with the present invention.

DETAILED DESCRIPTION OF THE DRAWINGS

A fuel tank 10 shown in FIG. 1 essentially in the shape of a parallelepiped, is designed for installation under a back seat of a passenger car. For this purpose, the tank 10 forms, in its center area, a tunnel 12 for at least one universal-joint shaft of a rear-axle drive to pass through. The tunnel 12 subdivides the tank interior space into two tank spaces 14, 16 which are connected to one another above the tunnel 12 via a bridging space 18.

A filler neck 22 leads into the tank space 16, at an outer tank sidewall 20 adjoining the tank space 16. A retaining vessel 26 open at the top and having a closed side wall is provided preferably below the discharge point on the bottom 24 of the tank space 16. A suction line 28 is connected to a fuel pump (not shown) and into the bottom of the retaining vessel 26. The spatial relationship of the retaining vessel 26 and the filler neck 22 ensures that the retaining vessel 26 is filled first during refuelling or when pouring in a reserve quantity of fuel.

A fuel return line 30 is connected to a tank sidewall 32 adjoining the tank space 14 and leads into a distributor 34 provided in tank space 14. Jet pumps 36, 38 of a known type comprise injector nozzles 40, 40', respectively, and injector funnels 42, 42', respectively, and are arranged at the bottom of a respective one of the tank spaces 14, 16.

The distributor 34 has two distributor spaces 34' and 34". A connecting line 44 leading to the jet pump 38 is connected to the distributor space 34'. The jet pump 36 is connected to the distributor space 34". The injector funnel 42 of the jet pump 36 is connected by a feedline 46 ending in the tank space 16.

A vent line 35 leading out into the upper area of the fuel tank space 14 is connected to the distributor space 31'. Gas bubbles accumulating in the distributor 34 can escape therefrom via the vent line 35 and thus cannot be entrained in the injector nozzle 40 and the connector line 44. A feedline 48 from the injector funnel 42' runs into the retaining vessel 26.

The two jet pumps 36 and 38, work in parallel as follows. The jet pump 36 delivers fuel from the tank space 14 into the tank space 16. From the space 16, the jet pump 38 delivers fuel into the retaining vessel 26. Complete emptying of both tank spaces 14 and 16 is therefore ensured. The delivery quantities of the two jet pumps 36, 38 can be harmonized with one another in such a way that more fuel can be pumped out of the tank space 14 per unit of time than out of the tank space 16, so that, during operation of the motor vehicle, there will always be less fuel in the tank space 14 than in the tank space 16.

In an alternative embodiment the jet pump 38 provided in the tank space 16 delivers fuel directly into the retaining vessel 26, but the jet pump 36, as apparent from the run of the feedline 46; as indicated by chain dotted lines, can also deliver directly into the retaining vessel 26.

The fuel tank 50 in the embodiment of FIG. 2 is analogous to the fuel tank 10 of FIG. 1. Accordingly, parts similar to the two embodiments are designated by the same reference numerals so that a further description thereof can be dispensed with.

Unlike the FIG. 1 embodiment, the fuel tank 50 is equipped with two series connected jet pumps 52, 54 for transfer-pumping fuel from the tank space 14 into the tank space 16. The jet pump 52 provided at the bottom of the tank space 16 is connected with its injector nozzle 52' to a fuel return line 56, a feedline 58 is connected to the injector funnel 52" and is run back, via the bridging space 18, into the tank space 14, and from tank space 14 back into the tank space 16 where feedline 58 leads into the top of the retaining vessel 26. The jet pump 54 installed at the bottom of the tank space 14 is connected in this feedline 58.

The jet-pump arrangement of FIG. 2 ensures that enough fuel is always pumped from the tank space 16 to the tank space 14 so that the jet pump 54 is completely immersed in fuel and therefore cannot generate any disturbing slurping noises when transfer-pumping fuel into the retaining vessel 26 into the tank space 16.

The jet pump 52 connected to the fuel return line 56 could also be installed in the tank space 14, and the jet pump 54 could be installed in the tank space 16. In such an arrangement, however, it would not be possible to eliminate the generation of slurping noises caused by the jet pump 52, since the tank space 14 would be continuously emptied by the jet pump 52 and the fuel quantity flowing back in this tank space 14 is less than that which is pumped out.

Instead of operating the jet pumps 36, 38 (FIG. 1) or 52, 54 (FIG. 2) by fuel flowing back, it is also within the spirit of the present invention to provide a supply line inside the fuel tank and into which a pump is inserted for drawing fuel from the retaining vessel 26 to operate the jet pumps.

In actual practice, the configuration of the fuel tanks 10 and 50 depend on the given installation conditions. Therefore, the fuel tank shapes are not restricted to a parallelepiped shape.

In a presently preferred construction, the fuel tank is manufactured from plastic by the blow molding process. The retaining vessel 26 together with the filler neck 22 and distributor 34 are integrally formed during the manufacturing process.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A fuel tank, comprising two spaced tank spaces connected to one another at a distance above their bottom, a fuel-removing device provided at the bottom of one of the tank spaces to draw fuel off, a first jet pump charged with fuel from a supply line located completely within the tank and arranged in the other of the tank spaces to feed fuel drawn off from the fuel supply present in the other tank space into the one tank space, a retaining vessel having a closed shell surrounding the fuel-removing device and extending upwards from a bottom of the one tank space, and a second jet pump arranged in the one tank space for delivering fuel to the retaining vessel, wherein the other tank space has a distributor comprising plural distributor spaces, with one of the distributor spaces being operatively connected with the first jet pump and another of the distributor spaces being operatively connected with the second jet pump, and a vent line communicating with an upper area of the fuel tank is operatively connected to the distributor.

2. The fuel tank according to claim 1, wherein the jet pumps are parallel connected.

3. The fuel tank according to claim 2, wherein the jet pump arranged in the other tank space is operatively connected to pump fuel from the other tank space to the one tank space, and fuel can be pumped by the other jet pump to the retaining vessel.

4. The fuel tank according to claim 3, wherein the jet pumps are arranged such that fuel can be pumped directly to the retaining vessel from the other tank space.

5. The fuel tank according to claim 1, wherein the jet pumps are operative in response to fuel flowing back in a return line into the fuel tank.

6. The fuel tank according to claim 5, wherein the jet pumps are parallel connected.

7. The fuel tank according to claim 6, wherein the jet pump arranged in the other tank space is operatively connected to pump fuel from the other tank space to the one tank space, and fuel can be pumped by the other jet pump to the retaining vessel.

8. The fuel tank according to claim 6, wherein the jet pumps are arranged such that fuel can be pumped directly to the retaining vessel from the other tank space.

* * * * *